(12) United States Patent
Zombori

(10) Patent No.: US 9,181,030 B2
(45) Date of Patent: Nov. 10, 2015

(54) ARRANGEMENT FOR STORAGE, WAREHOUSE RACK AND HANDLING MACHINE PARTICULARLY FOR SUCH AN ARRANGEMENT

(76) Inventor: Antal Zombori, Budapest (HU)

( * ) Notice: Subject to any disclaimer, the term of this patent is extended or adjusted under 35 U.S.C. 154(b) by 1005 days.

(21) Appl. No.: 13/202,365

(22) PCT Filed: Mar. 2, 2010

(86) PCT No.: PCT/HU2010/000024
§ 371 (c)(1),
(2), (4) Date: Sep. 23, 2011

(87) PCT Pub. No.: WO2010/100513
PCT Pub. Date: Sep. 10, 2010

(65) Prior Publication Data
US 2012/0027546 A1    Feb. 2, 2012

(30) Foreign Application Priority Data
Mar. 2, 2009    (HU) .................................. 0900128 P

(51) Int. Cl.
*B65G 1/04*    (2006.01)
(52) U.S. Cl.
CPC ........................................ *B65G 1/04* (2013.01)
(58) Field of Classification Search
CPC ............................ B65G 1/0414; B65G 1/0492
USPC .......................................... 414/267, 277, 279
See application file for complete search history.

(56) References Cited

U.S. PATENT DOCUMENTS

| | | | |
|---|---|---|---|
| 2,052,690 A | 9/1936 | Austin | |
| 3,608,750 A * | 9/1971 | Young et al. .................. | 414/277 |
| 3,779,403 A * | 12/1973 | Young ........................... | 414/279 |
| 4,523,887 A * | 6/1985 | Reiff .............................. | 414/664 |
| 4,529,066 A * | 7/1985 | Wieschel ...................... | 187/370 |
| 5,020,957 A * | 6/1991 | Liston ........................... | 414/279 |
| 5,056,625 A * | 10/1991 | Miskin et al. ................ | 187/235 |
| 5,149,241 A * | 9/1992 | Haymore et al. ............ | 414/279 |
| 5,170,863 A * | 12/1992 | Devroy ......................... | 187/224 |
| 5,433,293 A | 7/1995 | Sager | |
| 6,805,526 B2 | 10/2004 | Stefano | |
| 7,101,139 B1 | 9/2006 | Benedict | |
| 7,381,022 B1 | 6/2008 | King | |
| 2004/0228709 A1* | 11/2004 | Ueda ............................. | 414/279 |
| 2004/0228710 A1* | 11/2004 | Ueda ............................. | 414/279 |

FOREIGN PATENT DOCUMENTS

| EP | 0615946 A1 | 9/1994 |
|---|---|---|
| EP | 1348646 | 10/2003 |

* cited by examiner

*Primary Examiner* — Jonathan Snelting
(74) *Attorney, Agent, or Firm* — Dowell & Dowell, PC

(57) ABSTRACT

The invention relates to an arrangement for storage, which includes a warehouse rack containing shelves (14) located on columns, a handling machine movable to the designated shelf of the warehouse rack, and a handling device capable of placing goods or a storing device (30) for storing goods on the shelves (14) or taking them down from the shelves (14) and moving them to a designated location. A passive lifting device (240) is associated with the warehouse rack (10) and the handling machine (100) is formed as a locomotive handling machine capable of moving on a designated path, and the handling device (130) is located on the handling machine (100), and on the handling machine (100), there is an active lifting device (200), which can be coupled with the passive lifting device (240) and forward the handling machine (100) to the designated shelf in cooperation with the passive lifting device (240).

The invention relates also to a locomotive handling machine (100) provided with an active lifting device (200), and to a warehouse rack (10) mounted with a passive lifting device (240).

4 Claims, 10 Drawing Sheets

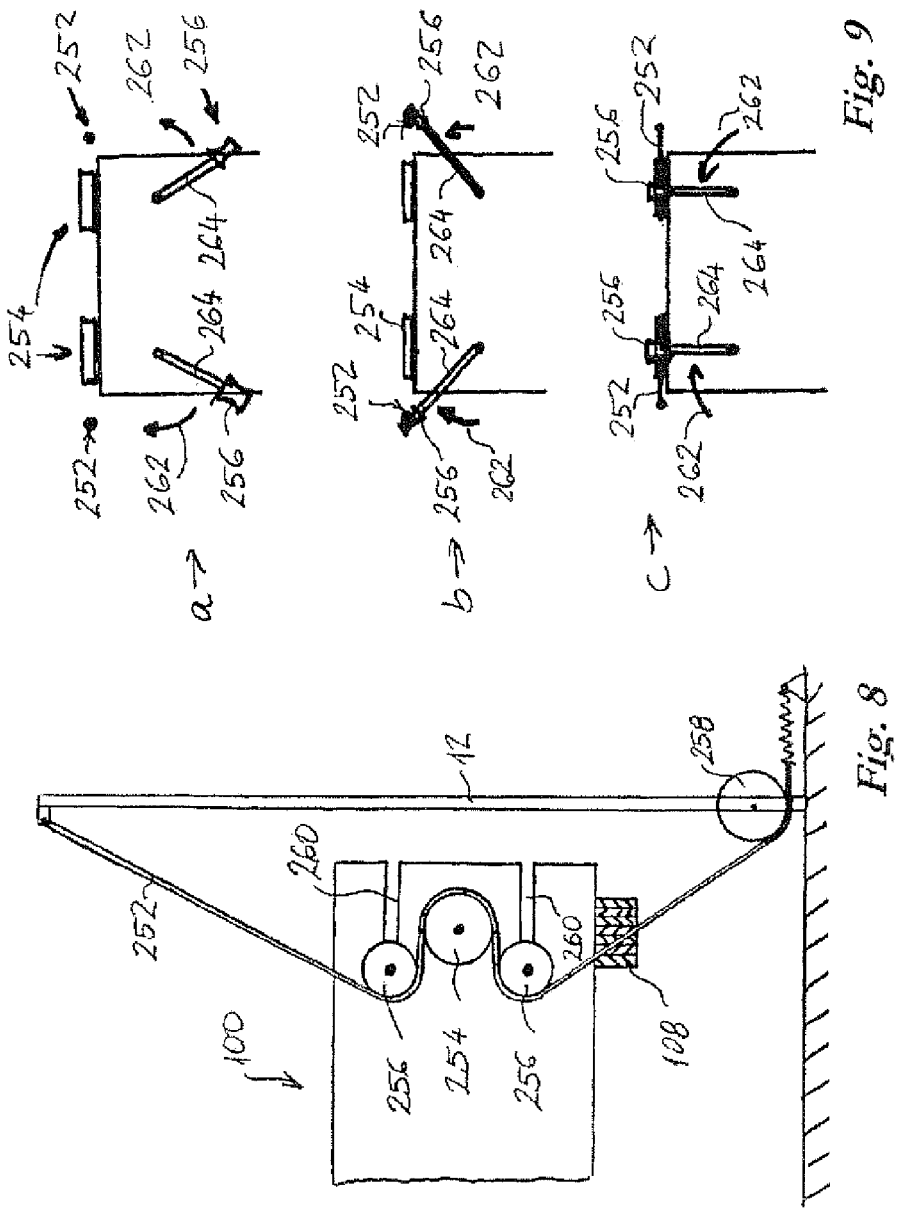

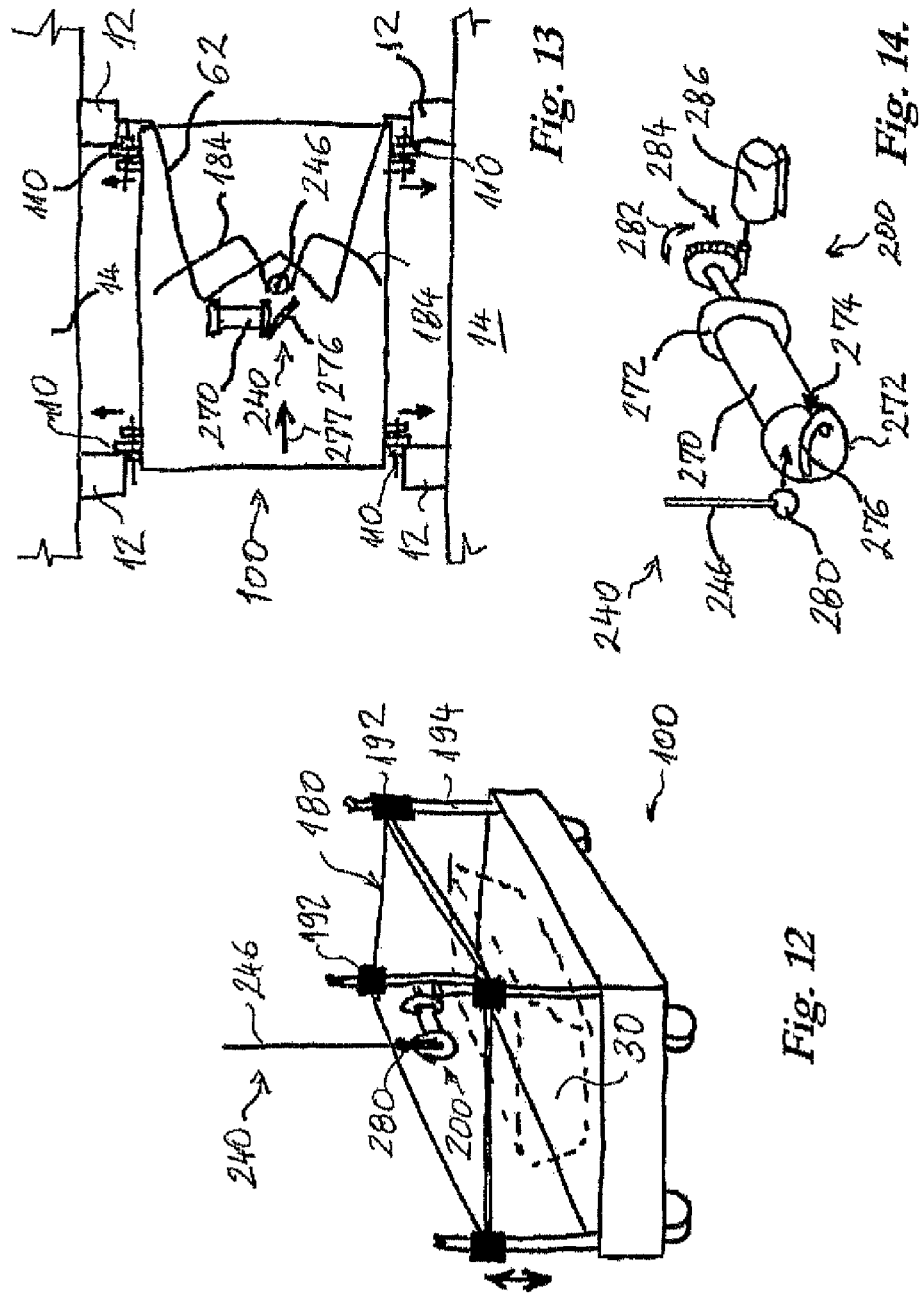

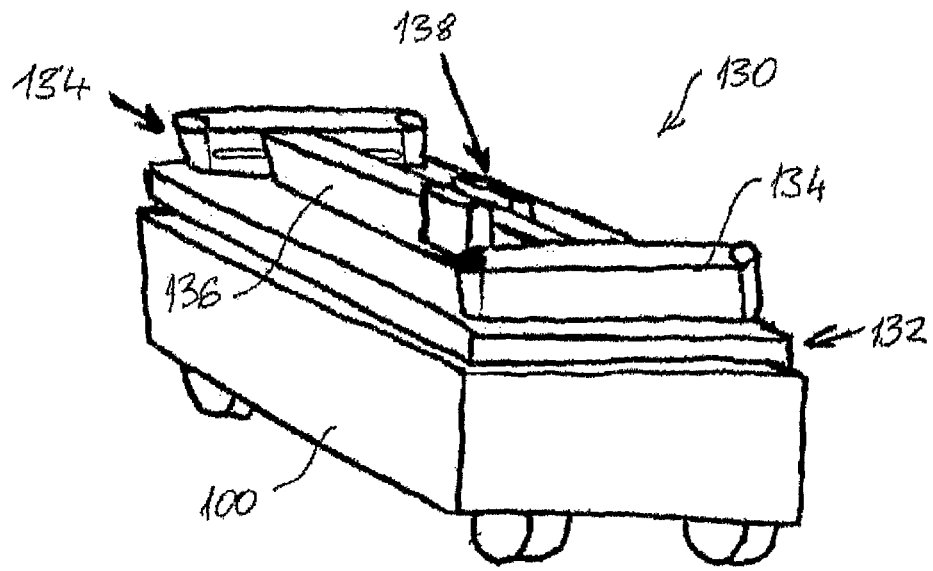
Fig. 16
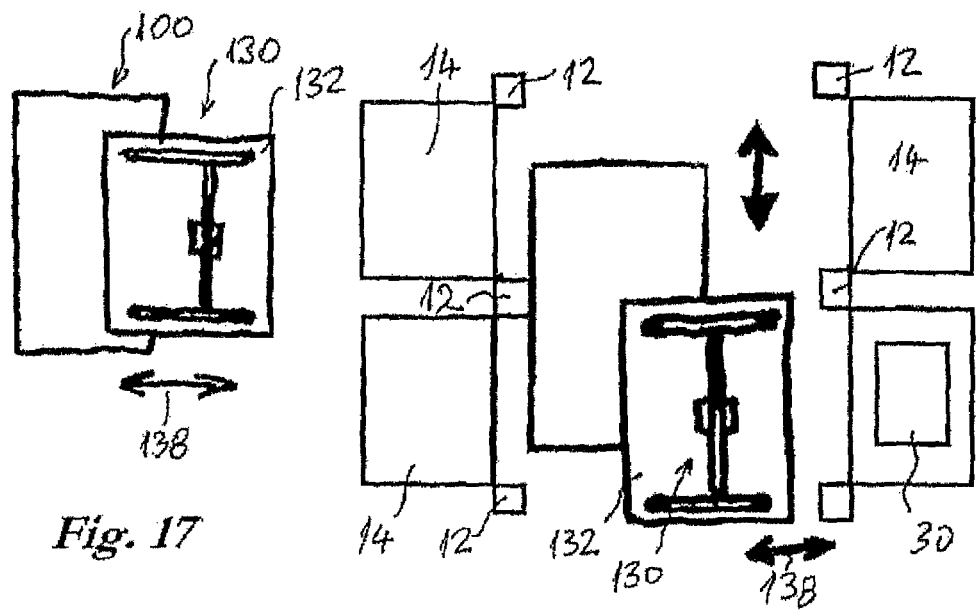
Fig. 17
Fig. 18

ARRANGEMENT FOR STORAGE, WAREHOUSE RACK AND HANDLING MACHINE PARTICULARLY FOR SUCH AN ARRANGEMENT

BACKGROUND OF THE INVENTION

1. FIELD OF THE INVENTION

The object of the intervention is an arrangement for storage, as well as a warehouse rack and handling machine particularly for such arrangement.

2. BRIEF DESCRIPTION OF THE RELATED ART

Currently, various types of arrangements are in use for storage, which arrangements comprise shelf systems made of warehouse racks, and machines packing goods from and to such shelf systems. According to the simplest version, a shelf system includes shelves on columns, where the columns and shelves define compartments. Goods are packed on the shelves usually in boxes or on pallets by means of a handling machine operating in aisles between warehouse racks.

Apart from manual work, the simplest case is that the handling machine is a forklift truck, by means of which the operator lifts the lift-fork to the desired height in front of the desired compartment and uses it to lift out from the compartment the box or pallet together with the goods in or on it, then lowers the lift-fork and forwards the goods to the desired location.

Furthermore, automatic storing systems are known, where computer controllable handling machines are installed in front of warehouse racks, which machines are capable of moving sideways, as well as upwards and downwards, and which lifts out from or places into the desired compartment the goods determined by the control, and in case of lifting them out, it puts down the out-lifted goods to a designated location.

A deficiency of the known systems is that only one handling machine can carry out fully efficient work in front of one warehouse rack only because they cannot bypass one another, and apart from a few exceptions, the operation of two handling machines at the same time between warehouse racks standing opposite each other is not feasible due to the usually small distance between them.

Another deficiency of the known systems is that the higher the warehouse, the more difficult it is to create an appropriate handling machine, moreover, to the end of quick service, in larger warehouses, handling machines have to be designed to be highly efficient and to operate fast, otherwise the average time of handling goods from the desired location to the desired compartment or from the desired compartment to the desired location is unacceptably long, which cannot be allowed in warehouses with great traffic and operating with many kinds of goods.

Due to the above reason, it is desired to the develop an arrangement for handling which allows that one rack is serviced by multiple handling machines at the same time, preferably in such a manner that they interfere with the operation of each other as little as possible.

SUMMARY OF THE INVENTION

It is understandable that in case this is achieved, by multiplying the number of handling machines, average service time can be reduced without having to speed up the operation of the handling machine at high costs.

Our other objective is to develop an arrangement where the design of the handling machine is substantially independent of the height of the warehouse rack, and a substantially more costly handling machine is not required even in case of a higher rack.

According to the invention, the aim set has been achieved by providing an arrangement which, in the same way as usual solutions, includes a warehouse rack containing shelves, a handling machine movable to the desired shelf of the warehouse rack, and a handling device capable of placing the goods or the device for containing the goods on the shelves or taking them down from the shelves and moving them to the desired location. According to the invention, this known arrangement has been improved in such a manner that the warehouse rack has been combined with a passive lifting device and the handling machine designed as a locomotive handling machine, which preferably travels along a predetermined path and is capable of travelling in the aisles between warehouse racks. The handling device is placed on such handling machine. An active lifting device is arranged on the handling machine, which active lifting device can be coupled to the passive lifting device and cooperate with it to move the handling machine upwards or downwards. Of course, the handling machine is also mounted with the sensors, navigating and steering devices, controllers, data transmission and data processing devices which are usually applied in programmed or remotely controlled locomotive devices and are known per se, and which can be designed and adapted to the invention by a professionals based on this disclosure.

The lifting device combined with the warehouse rack can be a cogwheel, cogged belt, chain, (wire) cable, or any other disconnectable power transmitting connection establishing either a positive coupling (engaging) or frictional connection. Accordingly, the active lifting device of the handling machine that can be put into a cooperative connection with the lifting device above may be a wheel connected by friction, e.g. a rubber roller, cogwheel, chain wheel, rope drum, endless chain or another shape mating the passive lifting device. An appropriate drive mechanism is connected to the active lifting device within the handling machine. The active lifting device and the passive lifting device are connected in such a manner that they cannot disconnect from each other in an uplifted position of the handling machine.

The power supply of the active lifting device is expediently electric, and in one of the possible versions whereof, the handling machine contains a battery, which is preferably electrically connectable to the electrically conductive devices arranged on the columns whereby the battery is rechargeable, or even, the drive mechanism can obtain the energy for moving upwards along the column directly from here.

The handling machine can preferably pass between two opposite warehouse racks.

The passive and the active lifting device can be connected to one another by a coupling mechanism. The task of the coupling mechanism is to establish and maintain a safe connection between the passive and the active lifting device after they are interconnected, which means that it should be able to bear the weight of the loaded handling machine without slipping or disconnection.

Preferably, the number of coupling mechanisms on the handling machine corresponds the number of active lifting devices, e.g. there are two coupling mechanisms, and each coupling mechanism can be brought into a cooperation connection with one passive lifting device associated with a column. The coupling mechanisms are connected to either a separate or a common operating mechanism.

During the operation of the arrangement according to the invention, on the instruction given from a computer control centre, the handling machine moving on the level of the floor stops in front of the designated shelf or compartment, at the respective spacing between the columns, and connected to a column on either side of the shelf but preferably to the passive lifting device associated with the columns on both sides of the shelf. Then using either its own power source or the electric power obtained from the electric conductor on the column, it is elevated to the desired compartment, where it places in or takes out the goods by using the handling device arranged thereon. After placing in the goods, it may remain in this location until further instructions. As instructed, it forwards any goods it has taken out to the desired location and puts them down if necessary. The handling device can be a robot arm or any other known device used in such equipment. Taken as a whole, the handling machine is substantially a locomotive robot mounted with the systems—e.g. detection, control, data transmission, power train systems—required for its operation.

In case of a preferable embodiment, the handling device on the handling machine can include an electromagnet capable of engaging with the storing device for storing goods by applying an appropriate force. The storing device can be a device, e.g. a case or a pallet, mounted with a soft magnetic piece. The electromagnet can be placed on a pushing-pulling mechanism that pushes the goods on the top of the handling machine on the shelf or pulls the storing device from the shelf onto the top of the handling machine by turning on the electromagnet. To facilitate pushing and pulling, a sliding surface with rollers or balls can be formed on the top of the handling machine in order to reduce friction.

The invention, the further objectives achievable by the invention, and further characteristics, advantageous features of the invention will be disclosed in details with reference to the attached drawings showing exemplary embodiments of the invention. In the drawing

BRIEF DESCRIPTION OF THE DRAWINGS

FIG. 8 shows the arrangement according to FIG. 7 adapted for connection of the passive and active lifting device of the arrangement;

FIGS. 9a to 9c show the phases of the connection of the active lifting device according to FIG. 8 to the chain constituting the passive lifting device;

FIG. 12 shows a schematic perspective view of an embodiment of the handling machine according to the invention designed similarly to an elevator cage, with an active lifting device containing a rope drum that can be connected to a passive lifting device formed as rope hanged at the middle between columns;

FIG. 13 shows a plan view of the handling machine according to FIG. 12 in a position between columns of the warehouse rack;

FIG. 14 shows a schematic perspective view of the active lifting device of the handling machine according to FIG. 12;

FIG. 16 shows an outline of a handling machine formed according to the invention, with a handling device placed on top;

FIG. 17 is a schematic plan view illustrating the operation of the lifting device according to FIG. 16;

FIG. 18 is a schematic plan view illustrating the operation of the lifting device according to FIG. 16 in lateral direction;

DESCRIPTION OF THE PREFERRED EMBODIMENTS

Figure 1:
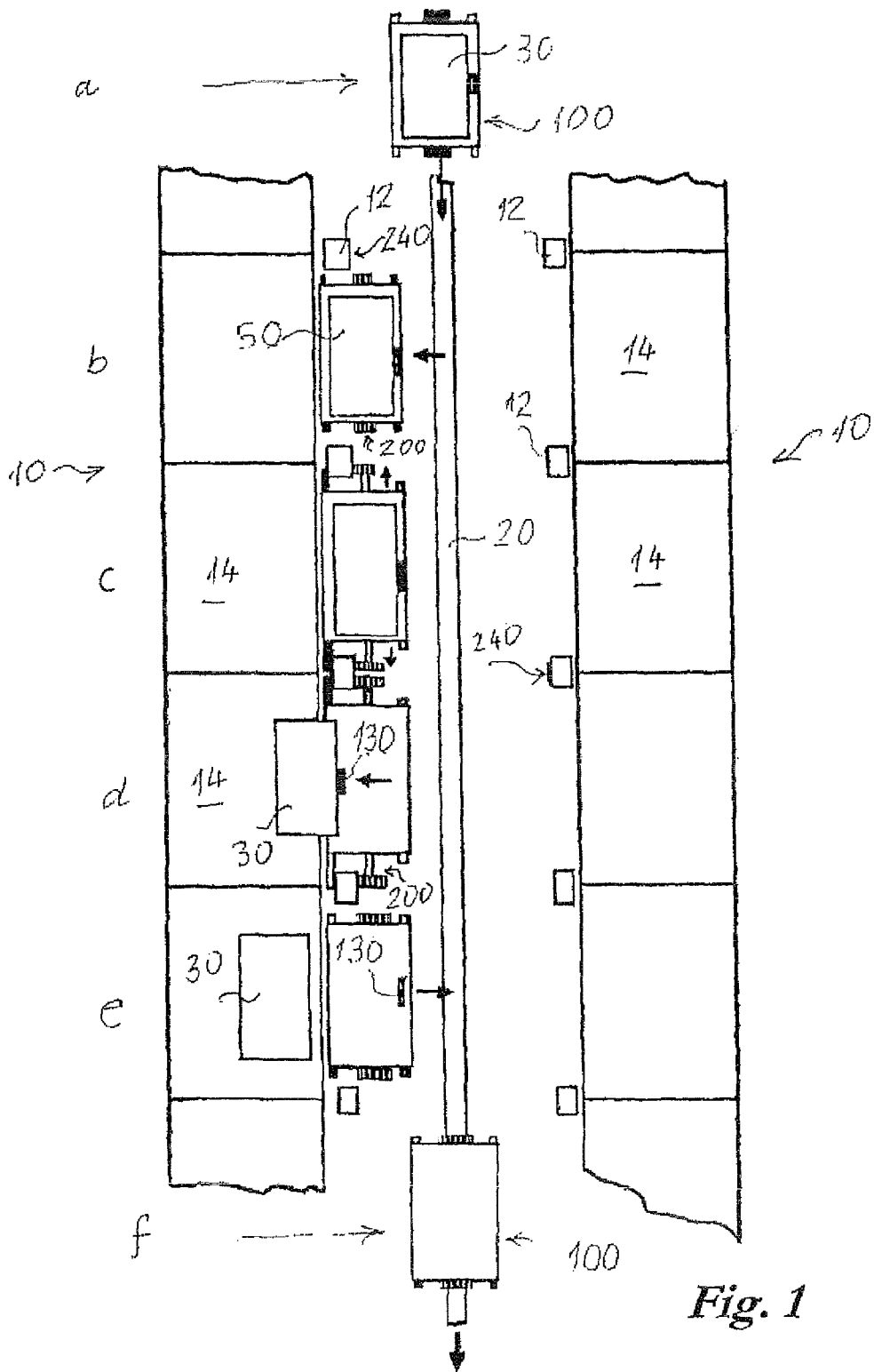
FIG. 1 shows an arrangement for storage according to the invention with two opposite warehouse racks with a handling machine pertaining to it, in different phases of handling.

In the drawings elements formed in the same or similar manner and having the same or similar functions are indicated with the same reference numbers. The examples shown in the figures are meant to provide assistance to a person skilled in the art to understand and interpret the principles and scope of the invention and to implement the same in practice.

FIG. 1 shows an arrangement for storage, wherein 10 warehouse racks are positioned opposite one another, and there is a path 20 suitable for transport between them. The 10 warehouse racks contain shelves 14 placed on standing columns 12, and such columns 12 are accessible from the path 20. On the surface of the columns 12 parallel with and facing the path 20, the columns 12 have a passive lifting device 240 formed as a superficial shape suitable for establishing a slip-free connection, for example a toothed bar. Locomotive handling machines 100 moving as vehicles can be lead along the 20 path by means of a known guiding means. Such guiding means can be for example an optically detectable pattern on the path, a light beam, a radio-frequency positioning system, a steering mechanism mounted with a proximity detector, a guide rail or any other guiding track. The purpose of this is to guide the handling machine 100 to the desired location of the warehouse rack 10 with sufficient accuracy, without sticking of the handling machine 100 or its bumping into the warehouse racks 10 en route.

A storing device 30, e.g. a box, a container, a pallet, can be placed on the top of the handling machine 100, and a handling device 130 can also be installed here, which can place the storing device 30 on the top of the handling machine 100 or place the storing device 30 from the top of the handling machine 100 to a desired location.

The 100 handling machine moves lengthwise along the 20 path between the warehouse racks 10, which is shown in position a) of FIG. 1. When the handling machine 100 reaches the to desired location, e.g. position b), in the middle between two particular columns 12, it stops and by means of an active lifting device 200 placed on its top, it connects to the 240 passive lifting device on columns 12 of the warehouse rack 10, as shown in position c) in FIG. 1.

Then the handling machine 100 is lifted to the desired height along the respective columns 12 by means of the operation of the passive lifting device 240 and the active lifting device 200, and it carries out the required handling operation at the desired shelf 14, which illustrated in position d) of FIG. 1.

The connection between the passive lifting device 240 and the active lifting device 200 is formed in such a manner that in their connected position the handling machine cannot disconnect from the passive lifting device preferably neither even in case of a fault, otherwise the racking machine could fall on the path between the warehouse racks, which could involve serious danger. Therefore, in their connected position, the active lifting device 200 and the passive lifting device 240 are protected against incidental disconnection, caused by e.g. power failure.

Figure 2:
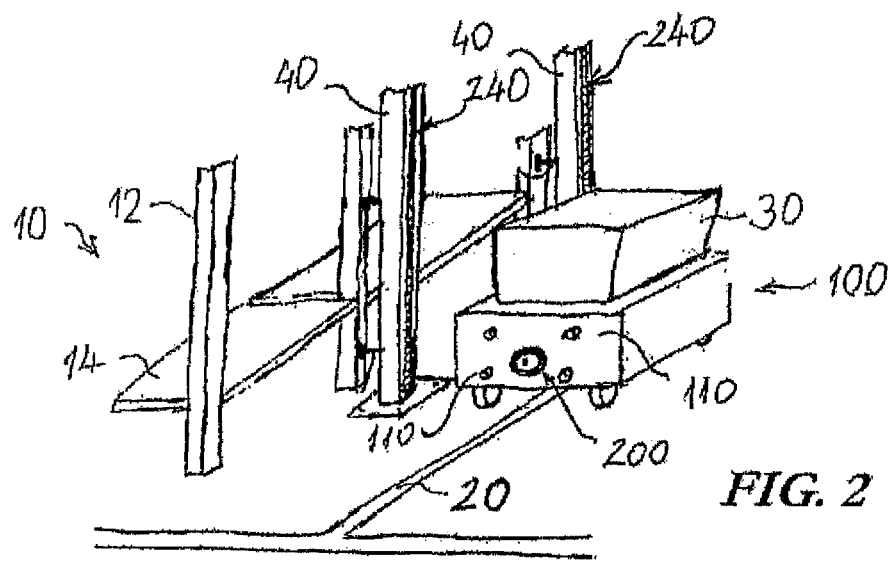
FIG. 2 shows the handling machine F position of FIG. 1, together with a section of the warehouse rack in perspective view.

In this example a handling device 130 moveable laterally and formed as an electromagnet can be used. After it has completed the handling operations (placing in or out a storing device 30), the handling machine 100 can stay in the position marked with an e) in the Figure, until it is directed to another location to carry out another handling task. In this case the handling machine 100 descends to the level of the path 20 along the respective columns 12 by way of the operating of the active lifting device 200 in the opposite direction, which is shown in position e) in FIG. 1. Subsequently the active lifting device 200 of the handling machine disconnects from the passive lifting device 240 arranged on the warehouse rack 10, and is repositioned on the path 20 in a ready-to-move state, which is illustrated in position f) of FIG. 1. FIG. 2 also shows the same position, where the handling machine is positioned on the desired path and is carrying the storing device obtained from the desired shelf as instructed.

Figure 3:
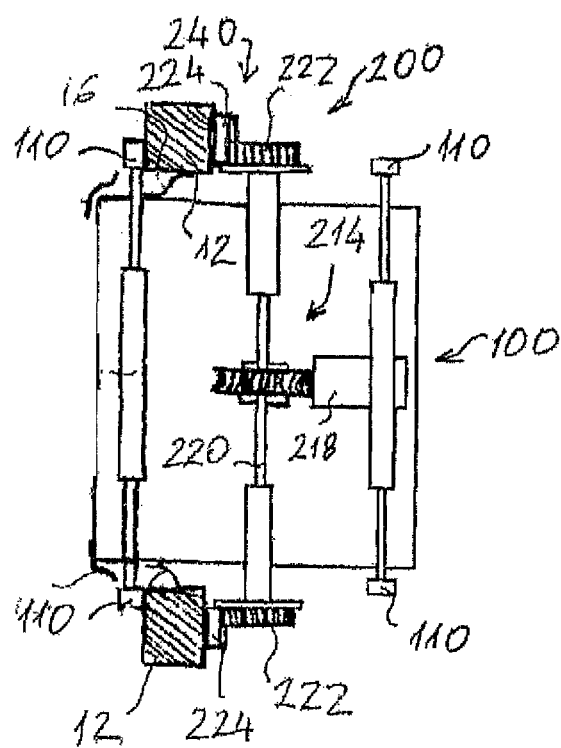
FIG. 3 shows an active lifting device of the handling machine in C position of FIG. 1 in a schematic horizontal sectional view.

FIG. 2 shows the handling machine 100 while FIG. 3 shows a simplified version of the active lifting device 200 of the handling machine 100, both in a schematic section view. In the mid-line of the handling machine 100, there is an elevating shaft 220 driven by a drive mechanism 214 formed as a screw drive which is connected to a motor 218, and there is a cogwheel 222 arranged at both ends of the elevating shaft 220. These two cogwheels 222 are located at such distance from each other that both can simultaneously connect to the 224 toothed bars arranged on the respective 12 columns and constituting the 240 passive lifting device. On the handling machine 100, there are also supporting rollers 110 rotatable around the axis parallel to the 220 elevating shaft, which 110 supporting rollers move outwards along the axis after the cogwheels 222 have connected to the toothed bars 224, and lean against the back of 12 column mounted with the toothed bar 224. This ensures that after it is engaged, the cogwheel cannot disconnect from the toothed bar as long as the guiding rollers are leaning against the side of the columns. The version shown in the figure is a symmetric arrangement, therefore the cogwheels on a driving axle can be connected to the warehouse racks on both sides of the paths, more specifically, to the toothed bars arranged on the columns. Therefore, in order to prevent the disconnection of the engagement, there are supporting rollers on the other side of the handling machine just like the ones that can be rotated around an axis parallel with the driving axle and leaned against the column from the back, on its side that is opposite to the one bearing the cogwheel.

Further component elements connectable to the lifting device and capable of lifting the handling machine in cooperation with the lifting device—e.g. a coupling mechanism 50 containing supporting elements, rollers—can be arranged on the handling machine, which elements prevent the disconnection of the passive and the active lifting device from one another, the drawing away of the handling machine from the respective column of the warehouse rack, the deflection of the handling machine connecting to the column like a cantilever, and the development of excessive stresses or tensions. The solution shown in FIGS. 2 and 3 serves a similar purpose, wherein there are two-two supporting rollers 110 above and under the plane of the cogwheels 222 arranged on the elevating shaft 220. Of course, a professional can develop several solutions like this without departing from the invention.

The power supply of the handling machine 100 is not specified herein, the solution of which is also a routine task for a person skilled in the field, and which does not represent an essential element of the invention. Electric power can be simply supplied into the 100 handling machine through insulated rails and current collectors contacting thereto. Optionally, the passive lifting device 240 can be used for this purpose.

Another solution for the power supply of the 100 handling machine is to establish docking stations where 100 handling machines currently not is use can be stationed safely at the designated locations of the warehouse racks 10 where electric connectors can be arranged, which provide power supply to the handling machine 100 serving the warehouse racks, which connectors can be connected to the appropriate and mating connectors of the handling machines 100. Such coupling mechanism is not specified in detail as several coupling to mechanisms and connectors suitable for this purpose are widely known for professionals.

The height of the electric connectors can be determined in such a manner that the bottom of a handling machine 100 in a connected position is at height where it does not obstruct the movement of other handling machines 100 below it. Thereby the charging of batteries can be carried out while the operation of the arrangement is undisturbed. If another handling machine 100 must pass through this particular docking station, then of course, this connected handling machine 100 must be removed from there either by moving it to a docking station by an adjacent column or, if it is sufficient, by elevating it temporarily to a higher level.

Figure 4:
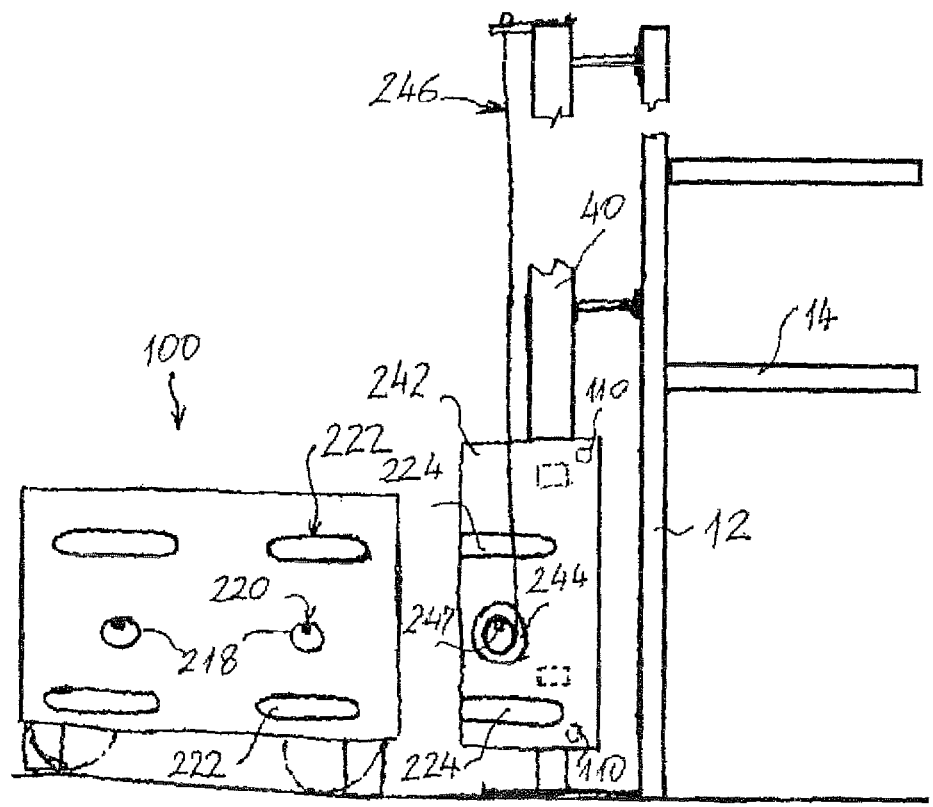
FIG. 4 shows a schematic side view of an arrangement according to the invention with a passive lifting mechanism formed as a rope connected to a carriage running along the column, and with a handling machine carrying an active lifting device that can be connected to said passive lifting mechanism.
Figure 5:
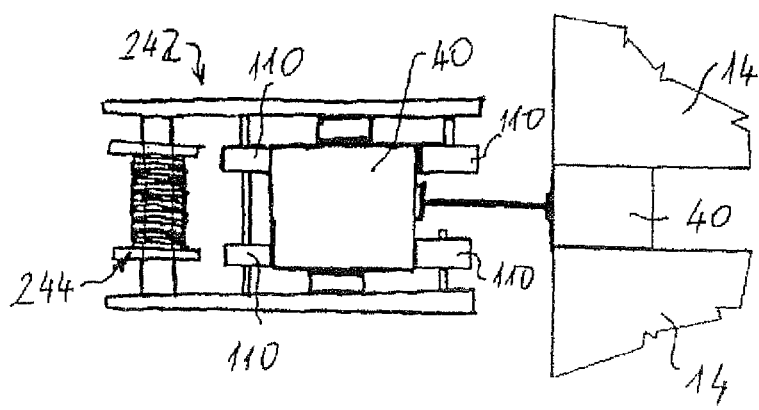
FIG. 5 shows a plan view of the carriage shown in FIG. 4.
Figure 7:
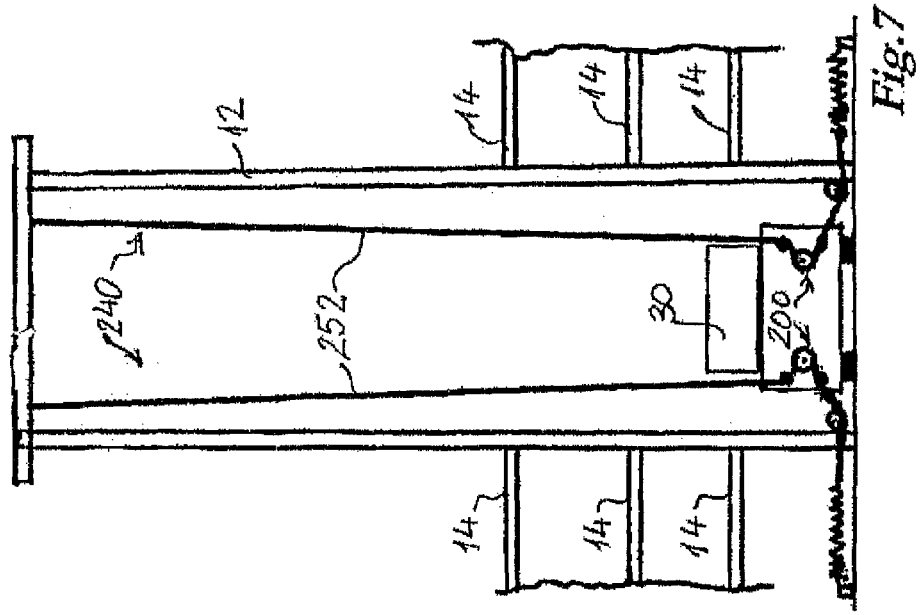
FIG. 7 shows the view of the arrangement according to FIG. 6 in the direction of an aisle between warehouse racks.
Figure 6:
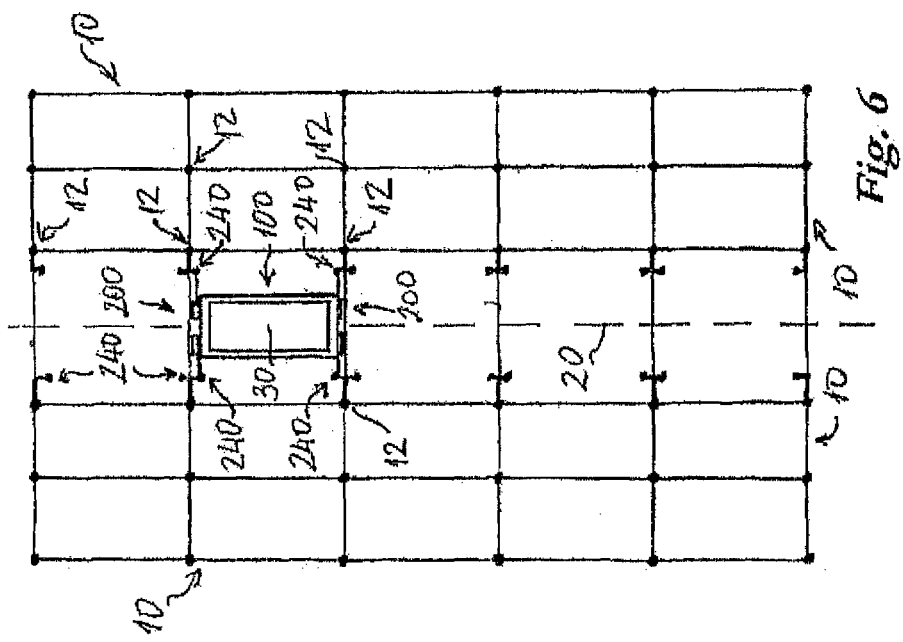
FIG. 6 shows an arrangement according to the invention with the passive lifting device formed as a chain.

FIG. 4 shows a solution where 40 supporting posts are arranged in front of the warehouse racks, in a manner fixed to the columns of the warehouse racks, and there is a carriage 242 guided rotation-free on each 40 supporting post. FIG. 5 shows a plan view of the carriage 242 connected to a supporting post 40, and it is clearly visible on the figure that the carriage 242 contains a rope drum 244, to which a wire cable 246 fixed at the top of the supporting post 40 is attached. Winding up the wire cable 246 on the rope drum 244 results in the elevation of the carriage 242 on the supporting post 40.

In order to reduce friction, the carriage 242 can be guided on the supporting post 40 by means supporting rollers of 110. On the carriage 242 there are also 224 recesses adapted to receive holding latches 222 arranged on the handling machine 100. The holding latches 222 cooperate with the recesses 224 so that in case latching is turned on, the holding latches 222 engage with the recesses 224 and cannot be removed until the holding latches 222 of the handling machine 100 are not released. The rope drum 244 can be deemed to form a part of the passive lifting device 240, and it can be connected to the active lifting device 200 on the handling machine 100 by means of some coupling member. The active lifting device 200 can be e.g. a 218 driving axle mounted with a 220, and inside the rope drum 244 there is such a through opening that can be slid over this driving axle 218, and a there is a 247 key protruding from the inner surface and fitting into the key-way 220. According to another approach, the carriage 242 with the rope drum 244 constitutes a part of the active lifting device 200.

During operation, the handling machine 100 approaches the carriages 242 on the supporting posts 40 from a sideward direction, and its 222 holding latches engage in the 224 recesses formed on the carriage. After latching is activated, the 100 handling machine projects its 218 driving axle, which engages in the aperture of the rope drum, and in the course of slow rotation, the key 247 engages in the key-way 220. Then as a result of further rotation of the driving axle 218, the wire cable 246 is wound up on the rope drum 244, and the carriage 242 together with the handling machine 100 connecting thereto is elevated to the desired height along the supporting post 40, where is completes the instructed handling operation.

In case of the version according to FIGS. 6, 7, 8, and 9a-9c, the wire cable 246 is substituted by a chain 252. The chain 252 constitutes the passive lifting device 240, which is able to engage with the chain wheel 254 arranged on the handling machine 100 in a slip-free manner. The lower end of the chain 252 is strained flexibly. When the chain is positioned on the chain wheel 254 on the handling machine 100, then its flexibly strained lower end is pulled against a string because due to its passing through the chain wheel 254 the lower end of the chain 252 becomes shorter. In the illustrated case, the handling machine 100 is connected to four chains 252 at the same time, and so there are four chain wheels 254 thereon, which are in a positive coupling with each other in terms of their rotation, and therefore the handling machine 100 will not tilt during elevation but keep its position. Of course, in order to reduce any instability or swaying, rollers or other non-illustrated guiding/supporting/damping elements may be placed on the handling machine 100.

FIG. 8 shows a structure in more detail (with exaggerated dimensions), by means of which the chain 252 can be connected to the chain wheel 254 constituting the active lifting device 200. The operation of this structure is shown on FIGS. 9a-9c.

FIG. 9a shows one-one chain 252 on the two adverse sides of the path 20, and the respective chain wheel 254 of the handling machine 100 is located opposite these chains. Furthermore, idle rollers 256 journaled for free rotation on 264 swivel arm are arranged on the handling machine 100. FIG. 9b shows that the swivel arm 264 slews around an arrow 262, and the idle rollers 256 reach the chain 252 then push it onto the respective chain wheel 254. FIG. 9c shows a fully on-pushed state, which corresponds the position illustrated in FIG. 8, where the chain 252 is connected to the driven chain wheel 254 along an approximately circular arc of 180 degrees. The 264 arms are guided by slits 260 in order to prevent their deviance in the vertical direction, which slits 260 are arranged on the front end of the handling machine 100.

Figure 10:
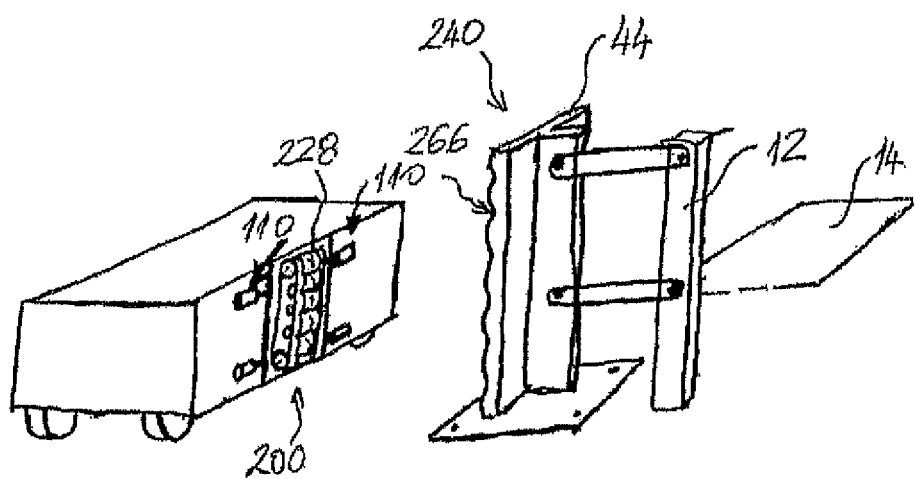
FIG. 10 shows a handling machine mounted with an active lifting device formed with an endless chain, in front of a warehouse rack column provided with an accordingly designed conformation.
Figure 11:
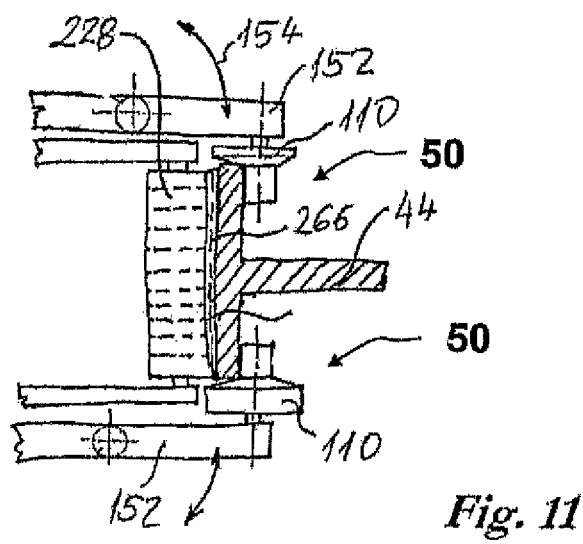
FIG. 11 shows a sectional view of the connection between the active lifting device comprising an endless chain and a column provided with a passive lifting device.

FIGS. 10 and 11 show an arrangement where the active lifting device 200 is constituted by an endless chain 228 arranged in a vertically drivable manner on the side of the handling machine 100 facing the shelves 14. The endless chain 228 can be supported at several places, for instance by means of non-illustrated rollers. The endless chain 228 fits e.g. into climbing means 266 of supporting columns 44, which are attached to the columns 12 of the warehouse racks 10 and are mounted with climbing means 266 on their surface facing the path. The endless chain 228 can be a multiplex roller chain or multiple chains arranged parallel with to each other.

In the course of operation, the 100 handling machine, moving sideways compared to the path, approaches the respective supporting column 44 while the endless chain 228 couples with the climbing means 266 of the supporting column 44. In the meantime or subsequently, the 50 coupling mechanism arranged on the handling machine 100 presses rollers 110 that are rotatable on arms 152 to the rear surface (compared to the front surface where the climbing means 266 are arranged) of the supporting column 44, and thereby it prevents the disengagement of the connection between endless chain 228 constituting the active lifting device 200 and the climbing means 266 on the supporting column 44.

FIG. 11 shows such coupling position where supporting rollers 111 formed with shoulders are leaning against the supporting column from the side and from the back, and guide the entire handling machine 100. In case of the version shown on FIG. 10, the handling machine 100 is connected to one single supporting column 44, which is formed to be of an appropriate strength, and the handling machine 100 is capable of serving shelves 14 at both of its sides. It is only natural that in the course of this asymmetric loads may arise, therefore both the supporting column 44 and the guiding and supporting elements of the handling machine 100 must be of an appropriate strength.

FIG. 12 shows another embodiment of the handling machine 100 applicable for the arrangement according to the invention, which is a solution similar to an elevator cage; this cage is formed to move upwards along columns 12 arranged at the corners of rectangle or square, and uses guiding elements, rollers, slides not shown in the figure in order to slide, roll upwards along the columns 12 or on the—here not illustrated—guiding means located on the columns 12. On each four corners of the cage, there is one-one guide column whereon a vertically movable platform 180 is guided, which platform 180 engages with guide sleeves 192. In the centre of the platform 180, there is a mechanism constituting the active lifting device 200 to be specified in more detail later, and this mechanism can be connected to a passive lifting device 240 formed as a rope 246.

FIG. 13 shows the plan view of the handling machine 100 in a position among four columns 12. It is visible in the Figure that the rope 246 is located in the centre of the rectangle defined by the columns 12. It can be seen that the handling machine 100 is resting on the columns 12 by means of rollers 110 with shoulders, which can be pushed outwards from the handling machine 100 along the arrows shown in the figure after the handling machine 100 is positioned the spacing between the 12 columns.

During operation, the handling machine 100 approaches the spacing between the columns to along an arrow 277 shown in FIG. 13, and on its top, on the platform 180, there are guiding elements 184, which guide the rope 246 hanging in the centre to the passive lifting device 240.

FIG. 14 shows the coupling and cooperation of the active lifting device 200 and the passive lifting device 240. The active lifting device includes a rope drum 270 arranged on the platform 180, which rope drum 270 is in a driving connection with a motor 286 through a screw drive 284. The rope drum 270 has one edge 272 on both of its ends, and there is an inclined slit 274 on the edge 272 opposite the screw drive 284, and it is connected to a pull-in device 276 running along a substantially helix form. The distance between the respective edge 272 and the pull-in device 276 is enough to accommodate any position differences that may derive from the incidental change of the relative position of the rope 246, and to catch a coupling element 280 located at the end of the rope 246 during the rotation of the 270 rope drum. The 280 coupling element is preferably a ball, which is affixed to the end of the 246 rope. Its diameter is large enough so that it will not to pass through the inclined slit 274 but it seizes outside the edge 272 during the rotation of the rope drum 270, and consequently, during the further rotation of the rope drum 270, the cooperating inclined slit 274 and the pull-in device 276 guide the rope 246 onto the peripheral surface of the rope drum 270, where the rope 246 is wound up in the course of further rotation. If desired, especially if the warehouse rack 10 is high, and therefore the rope 246 is long, a rope arranging mechanism can be associated with the rope drum 270, which rope arranging mechanism arranges the rope 246 on the surface of the rope drum 270. Such a rope arranging mechanism is well-known for the skilled practitioner, therefore a detailed specification thereof is not necessary.

The screw drive 284 is such a drive mechanism that allows for the rotation of the rope drum 270 only when the motor 286 is in operation. To this end, either the screw drive 284 is arranged with a great friction or the motor 286 is formed in such a manner that it is difficult to rotate it without power supply (for instance, reluctance motors are such motors).

By the rotation of the rope drum 270, the handling machine 100 can be elevated to the desired height to carry out its handling task, and can be lowered from this higher level by the operation of the motor 286 in the opposite direction. When the rope drum 270 is rotating in the opposite direction and the rope 246 is wound off from the rope drum 270, the inclined slit 274 and the pull-in device 276 release the ball 280, and thereby the rope 246 disconnects from the rope drum 270. In the course of disconnection, the rope 246, together with the ball 280 thereon, may come into a swinging state, which may be damped by two oppositely located damping elements 62 attached to the column 12. The damping element 62 is formed in such a manner that in the course of the upward movement of the handling machine 100, it either bends away or elevates together with the handling machine 100. After the handling machine 100 reaches the ground level, that is when it is lowered onto the path 20, the platform 180 is lowered on the guide columns 194 but the damping element 62 will not be able to follow such descent but will remain on the columns 12 at the former level. Subsequently, the handling machine 100 disconnects both from the rope 246 constituting the active lifting device 200 and the damping element 62, and will be able to move freely below them.

Figure 15:
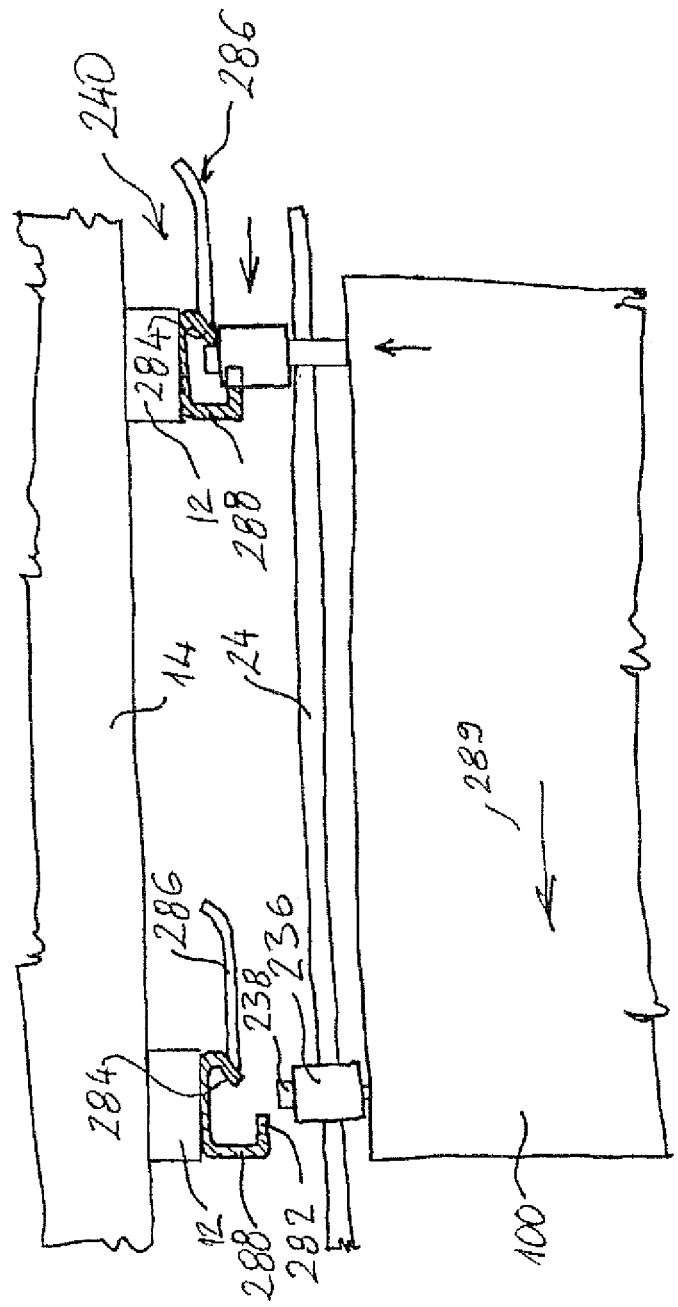
FIG. 15 shows a schematic partial plan view of a version of the arrangement according to the invention with a toothed bar as passive lifting device and with an engaging driven gear as an active lifting device.

FIG. 15 shows another embodiment of the arrangement according to the invention. The figure shows only a part of the handling machine, the part on one side of the path 20 (without the handling device) and only the nearby section of the warehouse rack 10. There are standing toothed bars 288 formed as asymmetric C-profiles on the columns 12. The middle part of the toothed bar 288 is fixed to the column 12 of the warehouse rack 10 (or to a column attached to the warehouse rack particularly for this purpose). On its more protruding part parallel with the path 20, there is a vertical toothing 282, which can be coupled with the cogwheels 236. The opposite side of the C-profile constitutes a guide rail 284, which is located at a distance from the toothing 282 in the direction perpendicular to the path 20. The guide rail 284 is folded inwards in an inclined manner, meaning that closes an acute angle with the middle part and is sloped if viewed from the direction of the 20 path.

The handling machine 100 has four cogwheels 236 that can be pushed outwards. Their rotational axis is perpendicular to the path 20. The four cogwheels 236 that can be pushed outwards constitute two wheel pairs located at the same distance from each other as the spacing between the columns 12 of the warehouse racks 10. Cogwheels 236 can preferably be pushed back against a spring if in an extended position. To the end of the cogwheel 236 a supporting roller 238 is connected, which is a free-running roller. The cogwheel 236 can be engaged with the toothing 282 in such a manner that the cogwheel 236 can be slid in between the toothing 282 and the guide rail 284 so that the supporting roller 238 leans against the guide rail 284 with a clearance at the same time. It should be clear that in this position, the cogwheel 236 cannot be removed from the toothing sideways 282, this coupling can be disjoined only by pulling out the cogwheel 236 from the C-profile 288. Along the travelling direction, there are guiding elements 286 arranged before the toothed bars 288, which guiding elements 286 substantially touch the guide rail 284.

The embodiment according to FIG. 15 is formed to engage four passive lifting devices 240, each operating as a vertical toothed bar 288 located at one corner of a rectangle.

FIG. 15 shows the arrangement from a plan view, and an arrow 289 indicates the travelling direction of the handling machine 100. On the left side of the figure cogwheels 236 of the handling machine 100 are pulled in and the handling machine 100 rolls on the cogwheels 236 along a toothed bar 24 that follows the path 20. The handling machine 100 approaches the respective columns 12 of the warehouse rack 10 on the toothed bars 24.

When the handling machine, travelling on path 20 from right to left in the figure, approaches the spacing between columns to be serviced, the cogwheels 236 are pushed out. If they are not pushed out, the handling machine 100 can freely pass the toothed bar 288 attached to the column 12. If they are pushed out, the free-running supporting roller 238 leans against the guiding element 286. On the right side of FIG. 15, the cogwheels 236 are in extended position. The cogwheels 236 can take up this position after sliding along the guiding element 286 in the course of their leaning, which guiding element 286 does not allow the cogwheels 236 to be pushed out as far as possible but it restrains them in a position where they do not disjoin from the horizontal toothed bar 24. As a result, the cogwheels 236 approach the toothing 282 in such a leaning position to engage the toothed bar 24, and if appropriately installed, the engagement with the toothing 282 will be correct. If properly engaging the toothing 282, the cogwheels 236 snap outwards as a result of the influence of the out-pushing force, and lean against the guide rail 284. In the meantime supporting rollers 238 adjust next to the 284 guide rail and prevent the subsequent disengagement of cogwheels 236 and toothing 282. After a cogwheel 236 has coupled with a vertical toothed bar 288, the supporting roller 238 passes the sloped guide rail 284 and jumps into the channel between the toothing 282 and the guide rail 284. Before jumping in, the cogwheel 236 has already engaged both the horizontal toothed bar 24 and the vertical toothed bar 288, which requires their position-accurate installation for the realisation of such double coupling. When it jumps into the channel, the cogwheel 236 disengages from the horizontal toothed bar 24 and by engaging the vertical 288 toothed bar, it lifts up the handling machine 100 during its rotation. The cogwheel 236 stays coupled with the vertical toothed bar 288 until the cogwheel 236 is pulled back. These parts together constitute the coupling mechanism that couples the active lifting device 200 and the passive lifting 240 device with each other, the operating mechanism of which coupling mechanism is a—here not illustrated—mechanism that pushes out the cogwheels 236, e.g. an electromagnet, and slides an axially slideable coupling. Disengagement may only take place if the 236 cogwheel is pulled back from its extended position.

This solution can be applied not only for coupling with four vertical toothed bars 288. For coupling with one or two vertical 288 toothed bars, it must be supplemented with appropriate clamping and supporting devices, rollers. The development of the details of such solution based on this description constitutes a routine task for professionals.

The horizontal toothed bar 24 can be arranged both continuously and discontinuously along the warehouse rack. In case of a discontinuous arrangement, the handling machine 100 can roll on wheels while the cogwheel 236 can run freely. The horizontal toothed bar 24 is installed only near the columns 12, possibly as a guiding section which is sloped or has a concave from the above and is placed on such side of the respective column where the guidance is required. In this case the cogwheel 236 runs free until it couples with the vertical toothed bar. After coupling, it is switched to a driven state from the free-running state.

FIG. 16 shows an embodiment of the handling machine 100 according to the invention mounted with a very simple handling device 130. The handling device 130 contains a handling tray 132 which is placed on the top of the handling machine 100 and is movable laterally towards the shelves of the warehouse rack and back. The handling tray 132 must be movable laterally at least to such an extent that the storing device 30 placed or to be placed on the shelf 14 can be freely slid through the space between the handling tray 132 and the shelf 14. If necessary, the handling tray 132 can be adjusted to a lower level as viewed from the direction of sliding but it can be leaned against the edge of the respective shelf 14 practically without any clearance. If viewed from above, there is an H-shaped arrangement on the top of the handling tray 132, wherein a cross element 136 connecting arms 134 of the H-shape can be moved towards and away from the shelves 14, expediently in both directions, while the arms 134 guide the cross element 136. The linear drive mechanism—e.g. a driven threaded spindle associated with a driving nut located on the 136 cross element—required for movement can be arranged in the arms 134 of the H-shape. In the middle of the 136 cross element, there is an electromagnet constituting a 138 coupling member, which cooperates with the—here not illustrated—ferromagnetic piece arranged on the storing devices 30 to be handled in the course of handling. The electromagnet and the ferromagnetic piece are dimensioned in such a manner that in a coupled position, the electromagnet overcomes the frictional force arising during the pulling of the 30 storing device. Naturally, this requires that the surface of the shelves 14 be kept clean and protected against corrosion. The surface of the handling tray 132 is expediently made of or coated with a low-friction material.

FIGS. 17 and 18 show an improved handling device 130 in two stages of the handling operation. This embodiment can be applied in particular to such an arrangement where the to handling machine 100 is connected to a passive lifting device 240 arranged on a single column 12 and is able to service the shelves 14 on the two sides of such column 12. On FIG. 17, the handling tray approaches the warehouse racks 10 from sideways. Subsequently, the handling tray 132 moving in a longitudinal direction, that is in the direction of the path 20, moves towards to one of the two adjacent shelves 14 in the respective height. In the following, the handling operation can be carried out in such asymmetric position as specified earlier.

Figure 19:
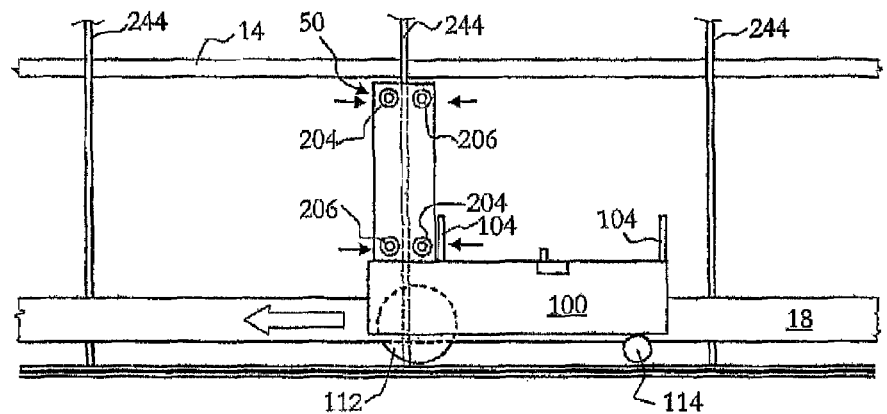
FIG. 19 shows a side view of the handling machine according to a further embodiment of the arrangement formed according to the invention in various phases of handling and shown in an aisle between two opposite warehouse racks and in a position before connecting to a passive lifting device formed as a protruding rail, where only the lower part of the warehouse rack is visible, said corresponding handling machine having rollers that can be pressed towards each other and engaging the rails by friction.
Figure 20:
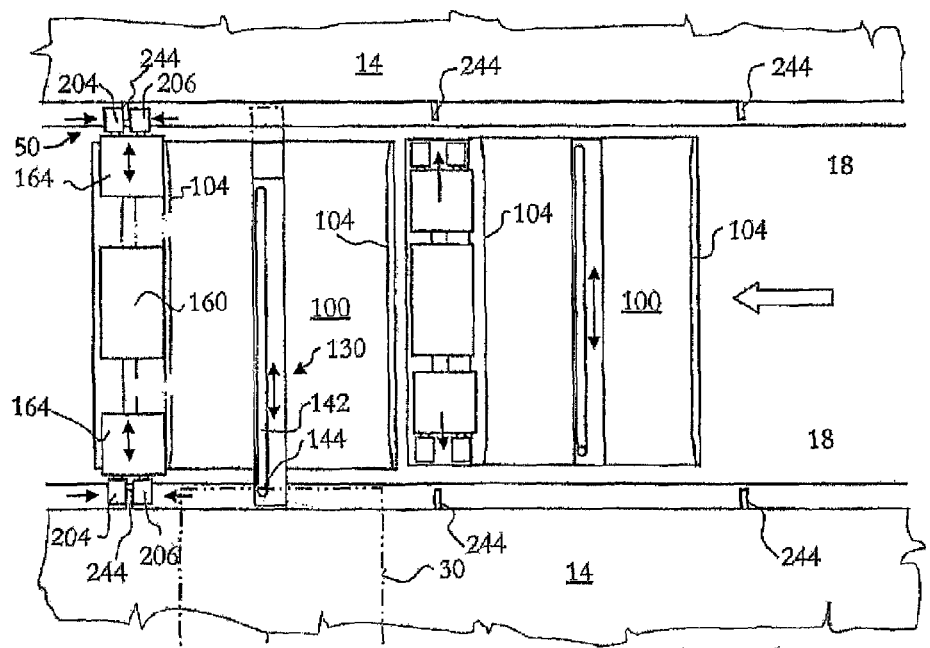
FIG. 20 is the plan view of the arrangement according to FIG. 19 and also shows another handling machine which is located at a higher level and therefore is not illustrated in FIG. 19, but here it is in a position when it is connected to the passive lifting device.

FIGS. 19 and 20 show an embodiment of the arrangement according to the invention where the passive lifting device 240 is constituted by a friction rail 244, while the active lifting device is constituted by friction wheels 204 that can be coupled with the former. The friction rail 244 can be made of e.g. zinc-coated steel and has a characteristic plane, which is perpendicular to the shelves 14 of the warehouse rack 10 in stands vertically. There is always an equal distance between two warehouse racks 10, which distance is just sufficient for the passing of a handling machine 100. In the present case in order to avoid the jamming of the handling machine 100 between the warehouse racks 10, a limiting wall 18 is attached to the bottom of every warehouse rack 10, which limiting wall 18 guides the handling machine 100 between the 10 warehouse racks with a small gap. The friction wheels 204 are arranged on the side of the handling machine 100 in such a manner that they can be extended and retracted. Their rotational axis is perpendicular to the edge of the 14 shelves and substantially parallel with the plane of the friction rails 244. The friction wheels 204 have a free end, and in an extended position, the distance between the free ends is greater than the spacing between the friction rails 244. Each friction wheel 204 is connected to a drive mechanism not illustrated herein.

There is a mounting frame 160 at the front of the handling machine 100, and there is a carriage connected—in a laterally extendable manner—to the mounting frame 160 on both sides. The friction wheels 204 protrude from this carriage 164 to a sideways direction. There is a supporting roller 206 beside each friction wheel 204 substantially at the same height as the friction wheel 204. The rotational axis of each friction wheel 204 and each respective supporting roller 206 can be pressed against each other, which is illustrated by the arrows shown in the left side of FIG. 20. The surface of the friction wheels 204 is made of a high-friction rubber. In an extended and pressed state, the friction wheels 204 are pushed against the friction rails 244 with a force that they can safely hold the handling machine 100 even in a fully loaded state or elevate the same along the friction rails 244 as a result of the drive exerted by the friction wheels 204. This carriage, together with a—here not illustrated—mechanism that presses the friction wheels 204 and the supporting rollers 206 against each other, constitute a 50 coupling mechanism.

The 100 handling machines move in the direction of the great arrow indicated on FIGS. 19 and 20. Their movement is ensured by the wheels 112 which are located on the bottom of the handling machine 100 and connected to the controlled drive mechanism. Between the warehouse racks 10 the wheels 112 receive an equal driving force but if they get out from between the warehouse racks, the 100 handling machine can be steered by the appropriately differentiated drive of the wheels 112. In order to ensure that the two driven wheels 112 always touch the floor, the handling machine 100 has a third wheel 114, or this third wheel 114 is substituted by two wheels arranged close to one another. The rotational axis of such third wheel 114 is horizontal, but the direction of this rotational axis itself can swivel compared to the axis of the wheels 112 so that it can follow the path defined by the differential drive of the wheels 112.

When the 100 handling machine moving between the warehouse racks 10 reaches the friction rail 244 along which it has to climb up, the handling machine 100—controlled by its sensors—adjusts the position of the friction wheels 204 and the supporting rollers 206 in such a manner that by extending the carriages 164, the friction wheels 204 and the supporting rollers 206 straddle the respective friction rails 244. Subsequently, the coupling mechanism 50 presses the friction wheels 204 and the supporting rollers 206 towards each other, so they are pressed against the respective friction rail 244. Then, by turning on the drive of the friction rails 204, the 100 handling machine can climb up along the respective friction rails 244.

There are guide elements 104 on the top of the handling machine 100, which guide elements 104 are substantially parallel with each other and perpendicular to the travelling direction. These guide elements 104 guide the storing device 30 transported by the handling machine 100 into the appropriate position. The handling device 130 formed for sliding in and pulling out the storing device 30 onto and from the shelf 14 is an elongated hollow member, which can be slid perpendicularly to the travelling direction and has a straight slit 142 on its top surface, in which slit 142 a vertical pin 144 can be slid.

On its bottom, the edge of the storing device 30 placed on the shelf 14 is not resting on the shelf 14 but overhangs the shelf 14 a little. In the course of its climbing upwards the handling device 130 pushes out the pin 144 at the appropriate time, and the pin 144 engages from below the edge of the storing device 30 or a hole shaped for this purpose on the storing device 30. Then the handling device 130 pulls in the pin 144, and the storing device 30 along with it. The pin 144 moves further along the slit 142 up to the other end of the 142 aperture, and in the meantime, it pulls the storing device 30 completely onto the top surface of the handling machine 100.

If, due to any failure, the friction between the friction wheels 204 and the friction rails 244 becomes insufficient, the handling machine 100 can be prevented from falling down by means of a braking device usually applied in elevators.

Several other supplementary elements may be used for the safe operation of the arrangement according to the invention. Principally, position signalling and position detection are of a special importance. For the purpose of proximity signalling and detection, radio frequency identification systems, shortly referred to as RFID systems can be used expediently. A version thereof applying passive RFID tags can be used for instance in such a manner that an RFID tag is placed on the edge of every shelf of the warehouse rack and on every storage device. Moving along the path, the handling machine reads the information of the tags of the bottom shelves, it forwards them to a central location, which defines its actual position. Simultaneously, or instead, bar codes can also be applied in combination with a bar code reader located on the handling machine.

The invention claimed is:

1. An arrangement for storage comprising a warehouse rack containing shelves located on columns, a handling machine movable to a designated shelf of a plurality of shelves of the warehouse rack, and a handling device for placing goods, or a storing device for storing goods, on the shelves or retrieving goods from the shelves, a passive lifting device, in a form of a rope, is mounted to the warehouse rack so as to be positioned above at least one shelf, and the rope having a free end including a coupling element, the handling machine is formed as a locomotive handling machine movable along a prescribed path, the handling device is located on the handling machine, an active lifting device in a form of at least one rope winding drum is carried on the handling machine, the passive lifting device being connected to the active lifting device by connecting the coupling element to the at least one rope winding drum and, in cooperation with the rope, raises and lowers the handling device relative to a designated shelf.

2. The arrangement according to claim 1 wherein the at least one rope winding drum is mounted on a carriage movable upwards and downwards along the columns of the warehouse rack, which carriage can be coupled with the handling machine, and on the at least one rope winding drum there is a driving element adapted to transmit a rotational drive, and that on the handling machine, there is a driving axle provided with a key-way that can be coupled with the driving element of the at least one rope winding drum, and which driving axle can be connected to the at least one rope winding drum.

3. The arrangement according to Claim 1 wherein there is a pull-in device moveable upwards and downwards on the handling machine, which pull-in device guides the rope on the at least one rope winding drum in cooperation with the coupling element.

4. The arrangement according to Claim 1 wherein there are electric connectors which supply electric power to the handling machine servicing the warehouse rack, which electric connectors can be connected to corresponding connectors of the handling machines, and that a handling machine being in a connected position is located at a height that it does not obstruct passing of other handling machines below it.

* * * * *